Nov. 3, 1964 R. SHAHBENDER 3,154,840

METHOD OF MAKING A MAGNETIC MEMORY

Filed June 6, 1960 3 Sheets-Sheet 1

INVENTOR.
RABAH SHAHBENDER
BY John V. Regan
ATTORNEY

INVENTOR.
RABAH SHAHBENDER
BY John V. Regan
ATTORNEY

METHOD OF MAKING A MAGNETIC MEMORY

INVENTOR.
RABAH SHAHBENDER
BY John V. Regan
ATTORNEY 3,154,840
METHOD OF MAKING A MAGNETIC MEMORY
Rabah Shahbender, Syria, N.J., assignor to Radio Corporation of America, a corporation of Delaware Filed June 6, 1960, Ser. No. 34,246
8 Claims. (Cl. 29—155.5)

This application relates to a new and improved magnetic memory structure and to a new method of fabricating the structure.

One objective of the invention is to provide a simple and relatively inexpensive magnetic memory structure.

Another objective of the invention is to provide a magnetic memory which is capable of relatively high operating speed.

Another objective of the invention is to provide a new and improved memory which is capable of being operated in any one of a number of different modes such as word organized, bit organized, and so on.

The magnetic memory of this invention includes at least two sheets of insulator material stacked over one another. At least one conductor lies between the sheets. Apertures are formed in the sheets, either before or after the sheets are stacked over one another, and the conductor or conductors pass between the apertures. A tubular film of magnetic material is formed on the exposed surfaces of the sheets and through the apertures and surrounds the conductor.

The invention will be described in greater detail by reference to the following description taken in connection with the accompanying drawing in which.

Figure 1:
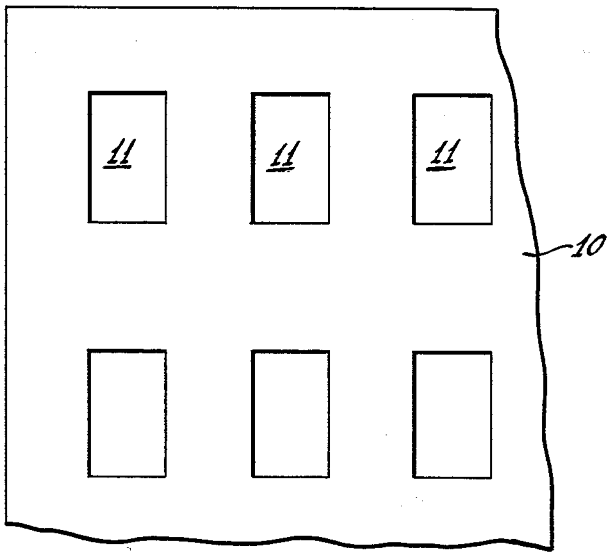
FIG. 1 is a plan view of one element of the memory of the invention.

In the detailed explanation which follows, the memory structure itself is described and then methods of fabricating the structure are described. FIGS. 1–4 should be referred to first. FIG. 1 illustrates one of the basic components of the memory. It is a sheet of insulating material 10 formed with a plurality of rectangular apertures 11. The material itself may have a thickness of about a mil or so, although thickness is not critical. The material may be a plastic such as Mylar, polyethylene, or other plastic, mica, or any one of a number of other insulating materials.

Figure 2:
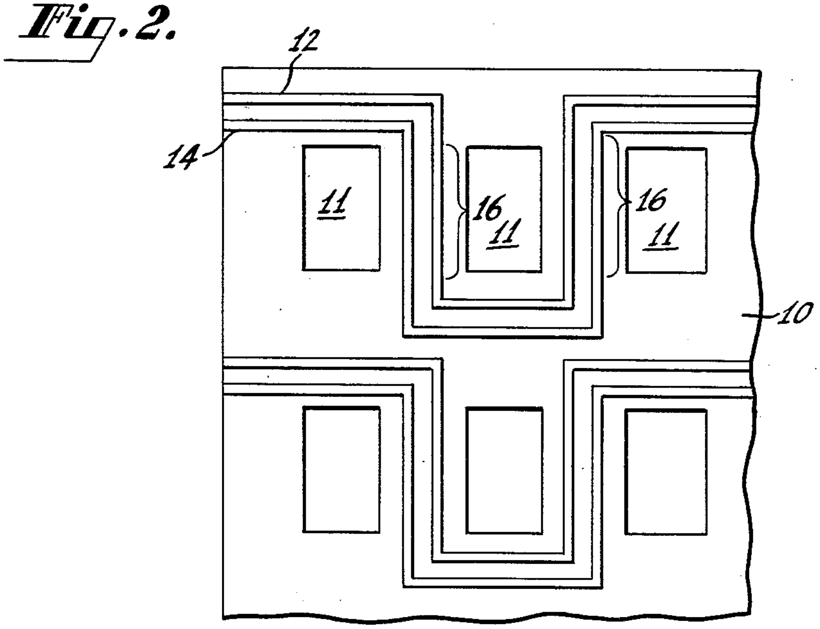
FIG. 2 is a plan view of the element shown in FIG. 1 with windings printed on it.

FIG. 2 shows the apertured sheet of FIG. 1 with a plurality of windings 12, 14 formed on the sheet. The number of windings will depend in each case upon the type of memory being made and it is to be understood that there may be more or fewer than two windings. It may be seen that the windings are so arranged that they lie side-by-side in the regions 16 where they pass between two adjacent apertures.

Figure 3:
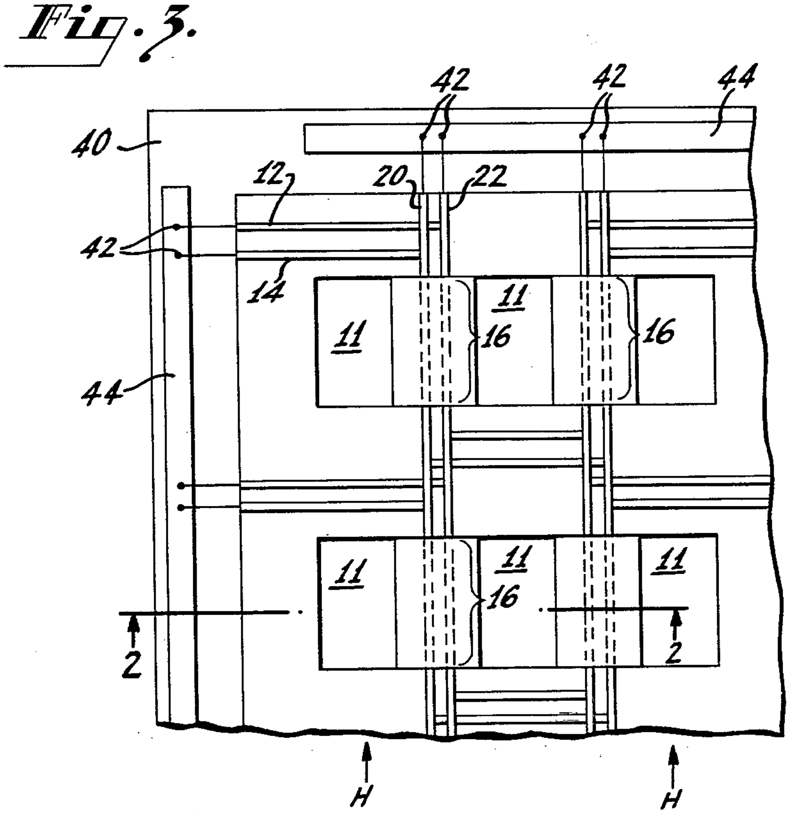
FIG. 3 is a plan view of a portion of a complete memory according to the invention.
Figure 4:
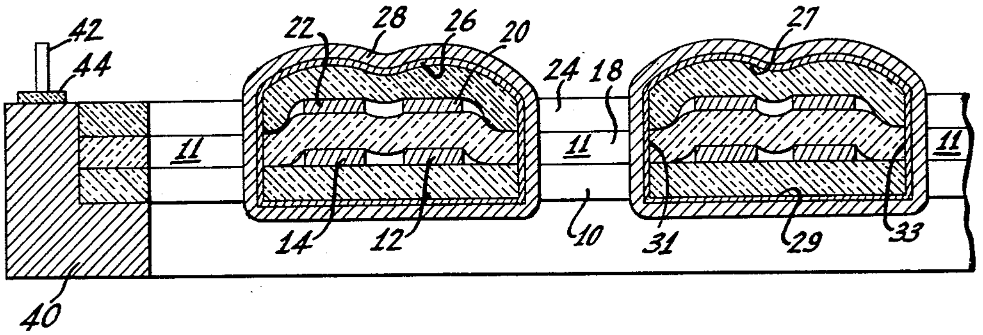
FIG. 4 is a section along line 4—4 of FIG. 3.

A portion of the complete "memory plane" according to the invention is shown in FIGS. 3 and 4. A second insulator sheet 18 identical to the first is located over the first sheet with the apertures in the two sheets aligned. One or more additional windings (two windings 20 and 22 are shown) are on the second insulator sheet 18 parallel to windings 12, 14 in the regions 16. Note that these pass between columns of apertures 11 whereas windings 12 and 14 pass between rows of apertures 11. A third apertured insulator sheet 24 aligned with sheets 10 and 18 is located over the windings and second sheet 18. The three insulator sheets are sealed to one another as, for example, by heating or adhesive or other means.

Surrounding the insulated conductors is a very thin tubular film 26 of a conductor which is easy to form on the insulator. The conductor covers the upper surface 27 of insulator 24, the lower surface 29 of insulator 10 and the edges 31 and 33 of the three sheets 10, 18, and 24 defining sides of apertures 11. A film 28 of substantially square loop magnetic material covers the conductor film.

A preferred conductor material for the tubular film 26 is gold or copper, however, other possibilities are silver and other sighly conductive materials. A suitable square loop magnetic material is a nickel-iron alloy such as Permalloy. A specific example is a Permalloy containing 81% nickel; however, other Permalloys such as Orthonol (50% nickel and 50% iron) are also suitable.

The entire structure just described may be mounted on a rigid frame 40. The sheets may, for example, be glued to the frame or, in other forms of the invention, clamped to the frame. The frame may be made of metal and terminals 42 may be fixed to an insulating terminal board 44 on the frame.

The completed memory consists of insulated conductors which pass through an array of tubular films ("cores") of square loop magnetic material. Only four "cores" are shown in FIG. 3, however, it is to be understood that a "memory plane" according to the invention may have many hundreds or thousands of such "cores." A complete memory may include many such planes. It may be operated as a coincident current "bit organized" memory, a "word organized memory" or in any other desired mode.

An important advantage of the memory of FIGS. 3 and 4 is that the conductors are already in place and need not be threaded through apertures. Another important advantage of the memory of the invention is that the magnetic film may be made of the order of several hundred to several thousand Angstroms in thickness. A memory system using thin film (under one or two thousand Angstroms) memory elements is capable of exceedingly high operating speed since thin films can be made to switch rapidly.

One method of fabricating a memory such as shown in FIGS. 3 and 4 is as follows. One or more windings such as 12, 14 (FIG. 2) are formed on an apertured sheet of insulating material, such as Mylar plastic, in a pattern such as shown in FIG. 2, for example. A number of different ways of doing this are possible. For example, a thin layer of copper, say 5,000 Angstroms or less, may be vacuum evaporated onto the Mylar by appropriately masking the Mylar plastic, placing the Mylar plastic and a crucible of copper in a vacuum, and heating the copper to its boiling point. The copper will then plate out on the unmasked areas of the Mylar plastic. Since vacuum evaporation is fairly time consuming, one may, after a relatively thin layer of copper has been formed on the Mylar plastic, remove the mask, and plate additional copper onto the thin layer (printed winding) by a standard electrodeposition process. The electrolyte, for example, may be copper sulphate or a more complex standard commercial solution. The electrodeposition is continued until the copper is deposited to a desired thickness such as one or two mils. The width of the winding may also be one or two mils. Here, as in other parts of this explanation, the various dimensions given are merely by way of example and depend in each case on engineering design criteria. The conductors should be sufficiently thick to carry the desired switching currents without excessive heating. The greater the current to be carried, the thicker the conductor. On the other hand, the conductors should not be made thicker than required to carry the desired switching current to permit structure to be of small size.

As an alternative to the vacuum evaporation technique described above, a standard photoengraving technique may be used to form the conductors. Here, the entire surface of the Mylar plastic is covered with a thin copper layer by any standard method such as spraying, electrodeposition, chemical deposition, or other means. Then, the copper is covered, by spraying, with a photoresist, for example Kodak "KPR" manufactured by Eastman Kodak. By photographic methods an image of the desired winding configuration is developed on the photoresist. The photoresist that is exposed to light hardens so that the unexposed portions may be washed away uncovering the copper. This copper may now be etched away leaving the desired winding configuration.

After the conductors are formed on the first sheet of insulating material 10, the second sheet of insulating material 18 is placed over the conductors on top of the first sheet and the apertures in the two sheets are aligned. A jig with alignment posts which pass through several of the apertures may be used for this purpose. The second set of conductors 20 and 22 may be applied over the second insulator sheet 18 in any of the ways described above and then the third insulator sheet 24 may be placed over the conductors and second sheet. The three insulator sheets may be bonded together after all of the conductors are in place. If a thermosetting plastic is used as the insulator sheet, the sheets may be secured together by applying heat, either directly or by dielectric heating means. As an alternative, with materials such as Mylar, special adhesives can be used to secure the sheets to one another. These are described in "Adhesives for Mylar Polyester Film," Bulletin No. 17, published by Dupont, dated October 1959. In this method, the second sheet is secured to the first by a suitable adhesive after the first two conductors are in place and the third sheet is secured to the second by a suitable adhesive after the second two conductors are in place. This may be done by applying an adhesive to the sheets before they are positioned one over another.

After the insulating sheets with the conductors imbedded in them are sealed, a thin layer (29 in FIG. 4) of gold, copper, or other metal is deposited over the areas extending between the horizontally aligned apertures 11 as viewed in FIG. 3. This may be accomplished in a number of ways. For example, the metal may be evaporated onto the insulating sheets or sprayed on through masks. Alternatively, the metal may be deposited by the electroless method already described over the entire sheets and layer of a photoresist, for example, the Kodak (KPR) photoresist, then sprayed over the sheet. The KPR photoresist is exposed to light through a mask and hardens in a required pattern. The soft KPR photoresist is washed off exposing the metal which may then be etched away. Thus, a metal such as copper or gold is left on the areas extending between the horizontally aligned apertures.

The purpose of the metal is to form a conducting surface to permit the electrodeposition of a magnetic material, such as Permalloy alloy. Since it is preferred to deposit the Permalloy over the entire plane or at least over extended sections of the plane in one operation, it is preferred that there be a continuous conducting path from one tubular metal element to the next. This path can be formed by appropriately masking the insulator so that leads or filaments which connect the tubular elements together deposit on the insulator.

After the gold or other metal is in place, a Permalloy alloy film of from several hundred to several thousand Angstroms thick is formed on the gold. Electroplating may be used. If filaments such as described above join the metal tubes together, the Permalloy alloy will plate out on the filaments, however, this does not interfere with the system operation.

The various metal deposition techniques discussed briefly above are standard methods known in the art. Some are described in more detail in an article by Wolf and McConnell appearing in the 43rd Proceedings of the American Electroplating Society, 1956, pages 1–4, for example.

In the method of making the memory discussed above, windings are deposited on sheets already formed with rectangular apertures. An alternative method is possible. This involves the use of sheets without apertures. One such sheet formed of Mylar plastic, for example, is coated on both sides with a metal such as copper, gold, copper chromium, or other metal. Then winding patterns are formed on the metal on both surfaces of the insulator sheet as, for example, by the photographic method described above, and the excess metal etched away. If necessary, the metal winding thickness may be increased by electroplating additional metal onto the winding. The result of the process as described so far is a single insulator sheet corresponding to the center sheet 18 of FIG. 4 with windings on both sides of the sheet. Next additional insulator sheets corresponding to sheets 10 and 24 of FIG. 4 are secured by an adesive or other means over the two surfaces with windings of the single insulator sheet. Then rectangular apertures are stamped in the laminated structure. The remainder of the manufacturing process is as already described.

Figure 5:
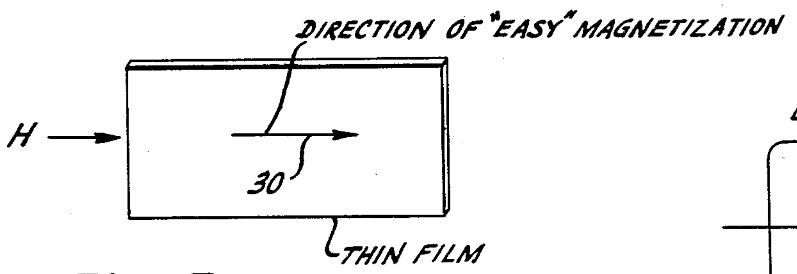
FIG. 5 is a sketch showing a thin magnetic film.
Figure 9:
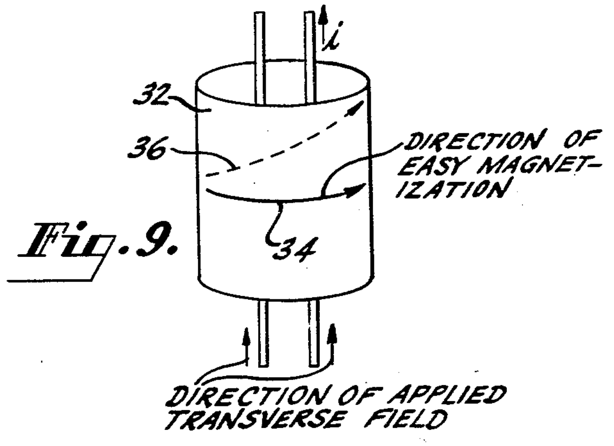
FIG. 9 is a sketch of a tubular magnetic film.

The structure resulting from the fabrication methods above includes a large number of tubes of magnetic material, each tube surrounding a plurality of conductors. It is preferred to so deposit the film that the film has a direction of "easy magnetization." One way of doing this is to apply current through one or more of the conductors in a given direction during the deposition of the Permalloy. For example, if, as is illustrated in FIG. 5, a magnetic field H is applied to a thin film during the time it is being deposited, the easy direction of magnetization will be as indicated by arrow 30. In like manner, if a current *i* is applied to a conductor passing through a tubular magnetic film 32 such as illustrated in FIG. 9, then the magnetic field produced by the conductor will be in the circumferential direction as indicated by arrow 34. Thus, the direction of easy magnetization will be in the circumferential direction 34 also.

Figure 7:
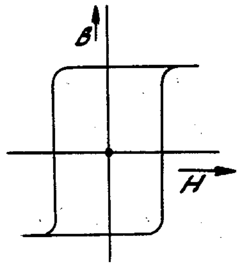
FIGS. 6–8 are graphs to explain certain properties of the magnetic film.
Figure 8:
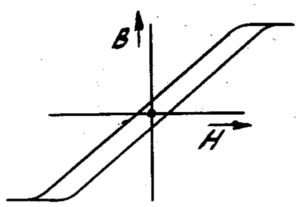

To digress a moment, the hysteresis loop for a thin film in the easy direction of magnetization is as illustrated in FIG. 7 and for the hard direction of magnetization (which is perpendicular to 30 in FIG. 5) as is illustrated in FIG. 8. B and H in FIGS. 7 and 8 have their conventional meaning, namely B is the magnetic flux density, and H is the magnetizing force. It is therefore clear that in usual applications, it is desired to operate the thin film as is indicated by the hysteresis loop of FIG. 7. In other words, the operation should be such that a magnetic field produced by current flow through a winding adjacent to the film causes magnetization in the direction parallel to or anti-parallel (180° out-of-phase) to the arrow 30 of FIG. 5.

Figure 6:
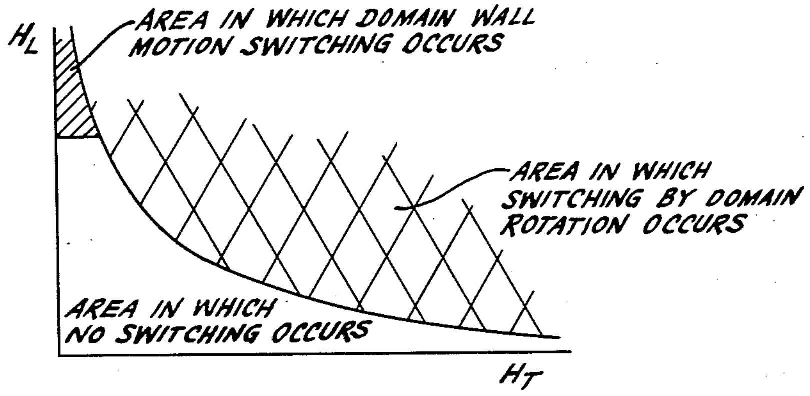

FIG. 6 illustrates the operation of a thin film magnetic memory such as shown in FIG. 9. The abcissa and ordinate represent the magnitudes of the magnetizing forces applied in a direction anti-parallel (longitudinal) and perpendicular (transverse) to arrow 34. $H_L$ in the graph is the longitudinal magnetic field; $H_T$ is the transverse magnetic field. For most memory applications, the desired area in which to operate is the one in which so-called switching by domain rotation occurs. This means that it is necessary to apply in time coincidence a first magnetic field component $H_L$ anti-parallel to 34 and a second magnetic field component $H_T$ at right angles to 34. Current in an appropriate direction passing through the windings within the tubular film will produce the desired anti-parallel magnetic field vector. The transverse magnetic field vector may be applied by an external magnetic field. As applied to the memory of FIG. 3, the transverse magnetic field may be one that is continuously on and may be formed by a large permanent magnet producing a magnetic field in the direction H of FIG. 3.

Alternatively, an electromagnet may be used for producing the continuous field.

The memory of FIGS. 3 and 4 may also be operated without applying a transverse field $H_T$. In this event, it is preferable during the fabrication of the memory to deposit the tubular magnetic film during the application of both a circumferential field and a transverse magnetic field. As is discussed above, the circumferential field can be generated by a current passing through one or more of the conductors and the transverse field can be applied by external means such as a permanent magnet. The direction of easy magnetization of the film will now be helical as is indicated schematically by the dashed arrow 36 in FIG. 9 rather than circumferential. In other words, there is now a "built-in" transverse magnetic field component so that the circumferential magnetic field component produced by a current through one or more of the conductors causes easy and very rapid switching by domain rotation.

If the direction of easy magnetization of the tubular film is circumferential and only an anti-parallel magnetic field is applied to switch the remnant state or direction of magnetization of the core, then the core will switch by a process known as "domain wall motion." It is possible to operate the memory of the present invention in this manner but the speed of switching is not as high as that obtained by switching by domain rotation.

Further discussion of thin magnetic film properties may be found in a number of articles appearing in the March 1958 issue of the Journal of Applied Physics, as, for example, in an article by D. O. Smith, JAP, volume 29, No. 3, page 264.

Returning now to the process of manufacturing the memory, the preferred method produces the memory shown in FIGS. 3 and 4. This memory has spaced thin film magnetic tubes with windings or conductors passing through the tubes. Due to the masking, the film occurs only in the areas between adjacent apertures in each row. Another fabrication method possible is one in which no masking is employed during the deposition of the gold and the magnetic material. In a memory made by this process, the final product has a thin magnetic film over the entire upper surface of insulator 24 (FIG. 4) and over the entire lower surface of insulator 10 and also over all exposed edges of the insulator. It is apparent that this method of fabricating the memory has the advantage of being simpler than the one previously described and is cheaper. However, the additional magnetic material does produce additional distributed circuit inductance and thereby lessens the speed capability of the memory.

What is claimed is:

1. A method of making a magnetic memory comprising the steps of applying to one surface of a first sheet of insulator material which is formed with apertures through the sheet, a plurality of leads, each lead lying on an area of the sheet located between an adjacent pair of apertures and extending in a direction at a substantial angle to an imaginary line joining the centers of said pair of apertures so that the leads bypass and do not intersect the apertures; placing a second sheet of insulator material similar to the first on said one surface of the first sheet with the apertures in the two sheets aligned; sealing the two sheets together; and applying a film of magnetic material of the type which is capable of assuming two remanent states over both exposed surfaces of insulator material and the walls of the aligned apertures so as to form a plurality of magnetic elements, each of tubular cross section, and each passing through a pair of apertures and surrounding at least one of the leads.

2. A method of making a magnetic memory comprising the steps of printing a plurality of leads which extend in the column direction on one surface of a first sheet of insulator material formed with apertures arranged in columns and rows so that each lead passes between but does not touch a plurality of adjacent pairs of apertures in the same columns; placing a second sheet of insulating material similar to the first over said one surface of the first with the apertures in the two sheets aligned; printing a plurality of second leads on the exposed surface of the second sheet of insulator material so that portions of each lead extend in the row direction and portions in the column direction, said portions extending in column direction passing between but not touching a plurality of adjacent pairs of apertures in the same row; placing a third sheet of insulator material similar to the second over the exposed surface of the second with the apertures in the three sheets aligned; sealing the three sheets together; and applying a film of magnetic material of the type capable of assuming one of two stable remanent states over the exposed surfaces of the sheets and the inner walls of the apertures so as to form a plurality of magnetic elements, each of annular cross section, and each surrounding at least two leads.

3. A method of making a magnetic memory comprising the steps of:

applying to one surface of a sheet of insulator material a plurality of spaced leads which lie side by side over at least a portion of their length;

placing a second sheet of insulator material similar to the first over said one surface of the first;

sealing the two sheets together;

forming two apertures in the sheets, spaced from the side-by-side leads, one on one side of the side-by-side leads and the other on the other side of the side-by-side leads; and applying a continuous film of magnetic material of the type which is capable of assuming two remanent states over the exposed surfaces of the insulator material and the inner walls of the apertures to form a magnetic element of tubular cross-section which is insulated from and surrounds the spaced leads over a portion of their length where they lie side by side.

4. A method of making a memory comprising the steps of forming conductive windings on two surfaces of a sheet of insulator material; securing to each sheet surface another sheet of insulator material to form a laminated structure consisting of three sheets with windings between the center sheet and the two outer sheets; forming a plurality of apertures in the laminated structure spaced so that a plurality of windings pass between but do not touch at least selected pairs of said apertures; and applying magnetic material of the type having two remanent states over the exposed surfaces of the laminated structure including the inner walls of the apertures.

5. A method of making a memory comprising the steps of forming conductive windings on two surfaces of a sheet of insulator material; securing to each sheet surface another sheet of insulator material to form a laminated structure consisting of three sheets with windings between the center sheet and the two outer sheets; forming a plurality of apertures in the laminated structure spaced so that a plurality of windings pass between but do not touch at least selected pairs of said apertures; applying a conductive film over the exposed surfaces of the laminated structure including the inner walls of the apertures; and electrodepositing a film of magnetic material of the type having two remanent states over the conductive film.

6. In a method of making a memory employing at least three sheets of material having insulator surfaces and each sheet having at least two apertures passing through the sheets in the same relative positions in the sheets, the steps of placing at least one conductor on each surface of the first sheet arranged to extend through the area between the two apertures in a direction such that the conductors avoid the apertures, placing the second sheet over one surface of the first sheet and the third sheet over the other surface of the first sheet with the apertures in the three sheets aligned; and applying magnetic material of the type having two remanent states over both the exposed surfaces of the second and third sheets and the walls of the aligned apertures.

7. In a method of making a memory, the steps of placing on one surface of a first sheet of material between two apertures therein, a plurality of conductors which extend in a direction such that they avoid the apertures, the surfaces of said sheet being insulators; placing a second sheet of material similar to first on said one surface of the first sheet of material with the apertures in the two sheets aligned; and applying a film of magnetic material having two remanent states over both the exposed surfaces of the two sheets and the walls of the aligned apertures so as to form a magnetic element of tubular cross section which is insulated from and surrounds the conductors.

8. A method of making a magnetic memory comprising the steps of:

applying a first lead to one surface of a sheet of insulator material;

applying a second lead which extends parallel and close to the first lead over at least a portion of the length of the second lead to the opposite surface of said sheet of insulator material;

placing a second sheet of insulator material similar to the first over said one surface of the first and a third sheet of insulator material similar to the first over said opposite surface of the first;

sealing the three sheets together;

forming two apertures having substantially parallel adjacent edges in the sheets, spaced from the leads, one on one side of the leads and the other on the other side of the leads, at a portion of the length of the leads where they are applied; and applying a continuous film of magnetic material of the type which is capable of assuming two remanent states over the exposed surfaces of the insulator material and the inner walls defined by said parallel adjacent edges of the apertures to form a magnetic element of tubular cross-section which is insulated from and surrounds the spaced leads over a portion of their length where they are parallel.

References Cited in the file of this patent

UNITED STATES PATENTS

| | | |
|---|---|---|
| 2,784,391 | Rajchman | Mar. 5, 1957 |
| 2,876,393 | Tally et al. | Mar. 3, 1959 |
| 2,877,540 | Austen | Mar. 17, 1959 |
| 2,878,463 | Austen | Mar. 17, 1959 |
| 2,937,351 | Craig | May 17, 1960 |
| 2,961,745 | Smith | Nov. 29, 1960 |
| 2,981,932 | Looney et al. | Apr. 25, 1961 |
| 2,988,668 | Lincoln et al. | June 13, 1961 |
| 3,138,785 | Chapman et al. | June 23, 1964 |